United States Patent
Seo et al.

(10) Patent No.: US 10,252,690 B2
(45) Date of Patent: Apr. 9, 2019

(54) SIDE AIRBAG GUIDE AND VEHICLE SEAT WITH SIDE AIRBAG USING SAME

(71) Applicant: HYUNDAI DYMOS INCORPORATED, Seosan-si, Chungcheongnam-do (KR)

(72) Inventors: Jin Ho Seo, Yongin-si (KR); Soo Keun Jang, Incheon (KR); Young Min Hyun, Hwaseong-si (KR); Byoung Hoon Lee, Osan-si (KR)

(73) Assignee: HYUNDAI DYMOS INCORPORATED, Seosan-si (KR)

( * ) Notice: Subject to any disclaimer, the term of this patent is extended or adjusted under 35 U.S.C. 154(b) by 31 days.

(21) Appl. No.: 15/651,463

(22) Filed: Jul. 17, 2017

(65) Prior Publication Data
US 2018/0015898 A1    Jan. 18, 2018

(30) Foreign Application Priority Data
Jul. 18, 2016   (KR) .................. 10-2016-0090658

(51) Int. Cl.
*B60R 21/207*    (2006.01)
*B60R 21/2165*    (2011.01)
(Continued)

(52) U.S. Cl.
CPC .............. *B60R 21/207* (2013.01); *B60N 2/64* (2013.01); *B60R 21/2165* (2013.01); *B60R 2021/0006* (2013.01); *B60R 2021/161* (2013.01)

(58) Field of Classification Search
CPC ..................... B60R 21/207; B60R 21/2165
See application file for complete search history.

(56) References Cited

U.S. PATENT DOCUMENTS 6,578,911 B2 *  6/2003  Harada ................ B60N 2/5825
                                                  280/730.2
7,637,529 B2 * 12/2009  Tracht .................. B60R 21/207
                                                  280/728.2
(Continued)

FOREIGN PATENT DOCUMENTS

JP        9-323609 A    12/1997
JP    2013-124028 A     6/2013
(Continued)

OTHER PUBLICATIONS

Korean Office Action dated Jun. 15, 2017 of corresponding Korean Patent Application No. 10-2016-0090658—7 pages.
(Continued)

*Primary Examiner* — Faye M Fleming
(74) *Attorney, Agent, or Firm* — Knobbe Martens Olson & Bear LLP

(57) ABSTRACT

Disclosed is a vehicle seat with a side airbag, which includes an airbag module with an airbag cushion accommodated therein, a seat back frame with the airbag module mounted thereto, a seat back pad provided with a bolster protruding forward at each of opposite sides thereof and an accommodation space allowing the airbag module to be accommodated therein; a bolster wire inserted into the bolster to support a side load of an occupant; and a side airbag guide configured such that a first side thereof is locked to the seat back frame and a second side thereof is coupled to the bolster wire, to guide a deployment direction of the airbag cushion.

5 Claims, 6 Drawing Sheets

(51) Int. Cl.
*B60N 2/64* (2006.01)
*B60R 21/00* (2006.01)
*B60R 21/16* (2006.01)

(56) References Cited

U.S. PATENT DOCUMENTS 9,539,975 B2 * 1/2017 Tanabe ................ B60N 2/68
9,725,062 B2 * 8/2017 Kochem ............ B60R 21/2165
9,914,422 B2 * 3/2018 Yoo .................. B60R 21/207

FOREIGN PATENT DOCUMENTS

KR       10-0794031  B1    1/2008
KR  10-2015-0112147  A   10/2015

OTHER PUBLICATIONS

Office Action dated Oct. 25, 2017 of corresponding Korean Patent Application No. 10-2016-0090658—6 pages.

* cited by examiner

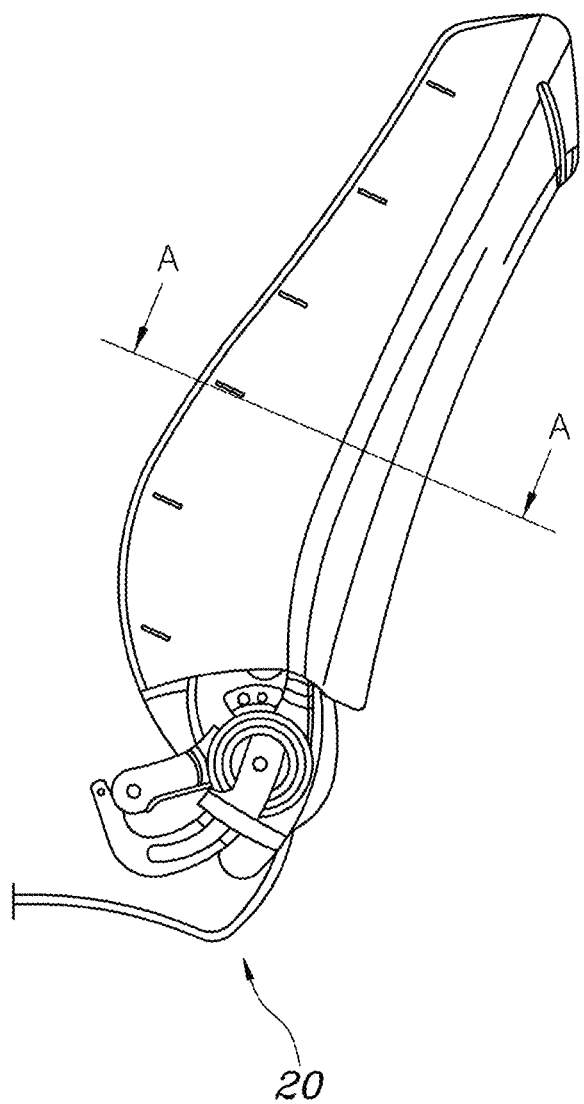
[FIG. 1]

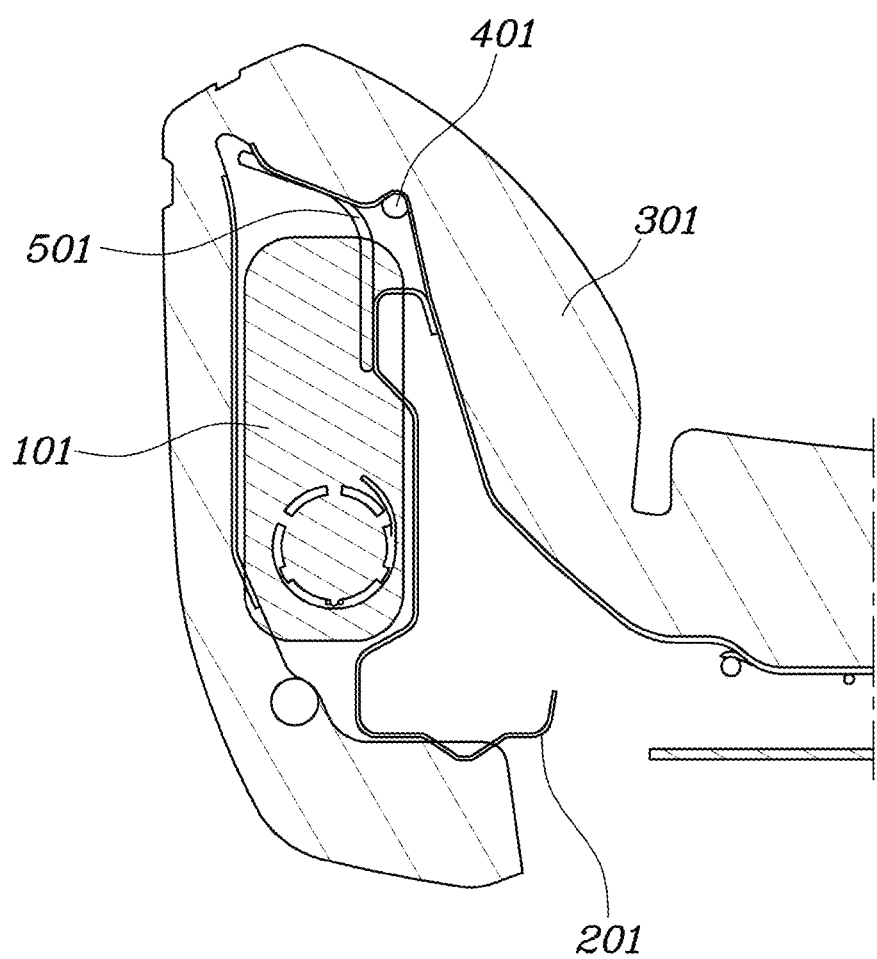

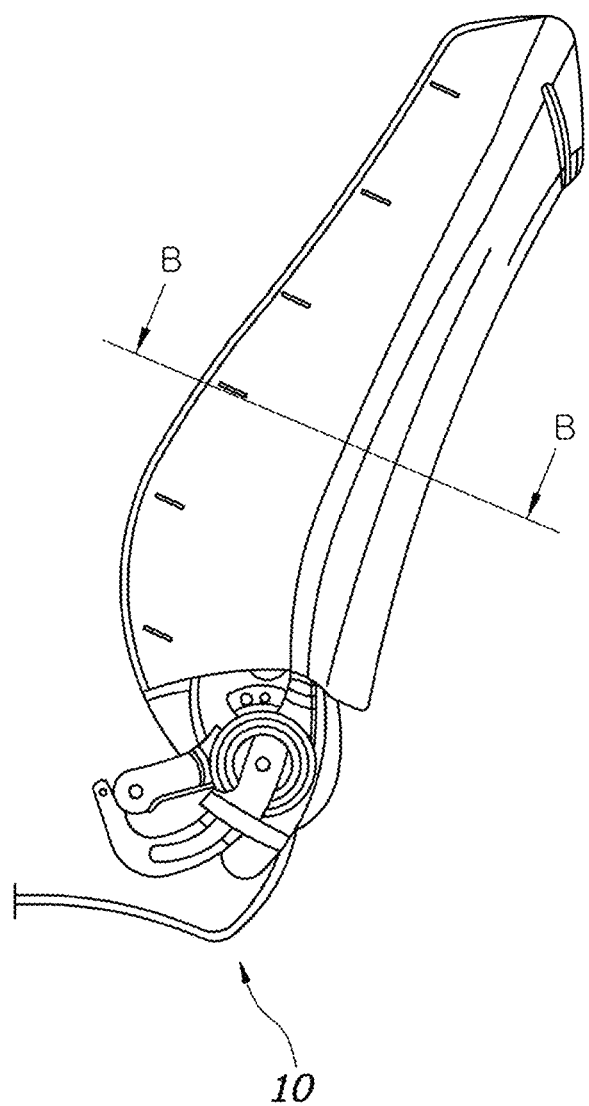
[FIG. 3]

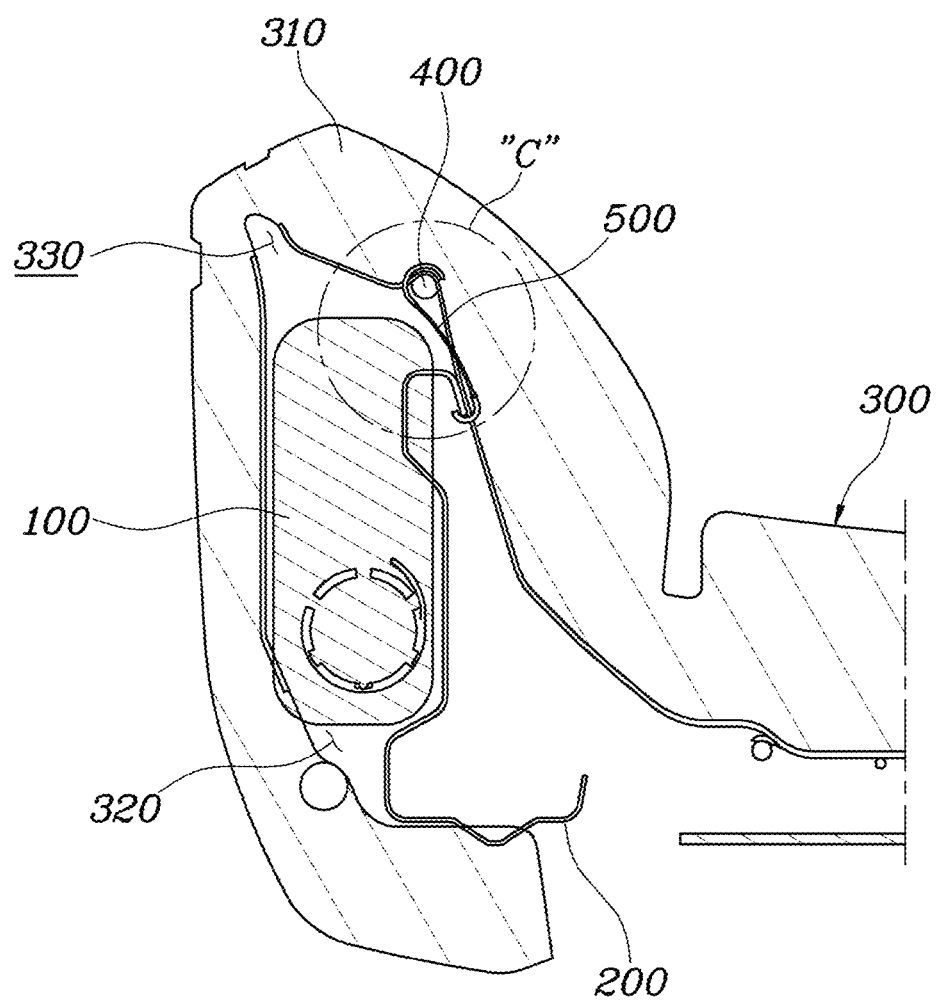
[FIG. 4]

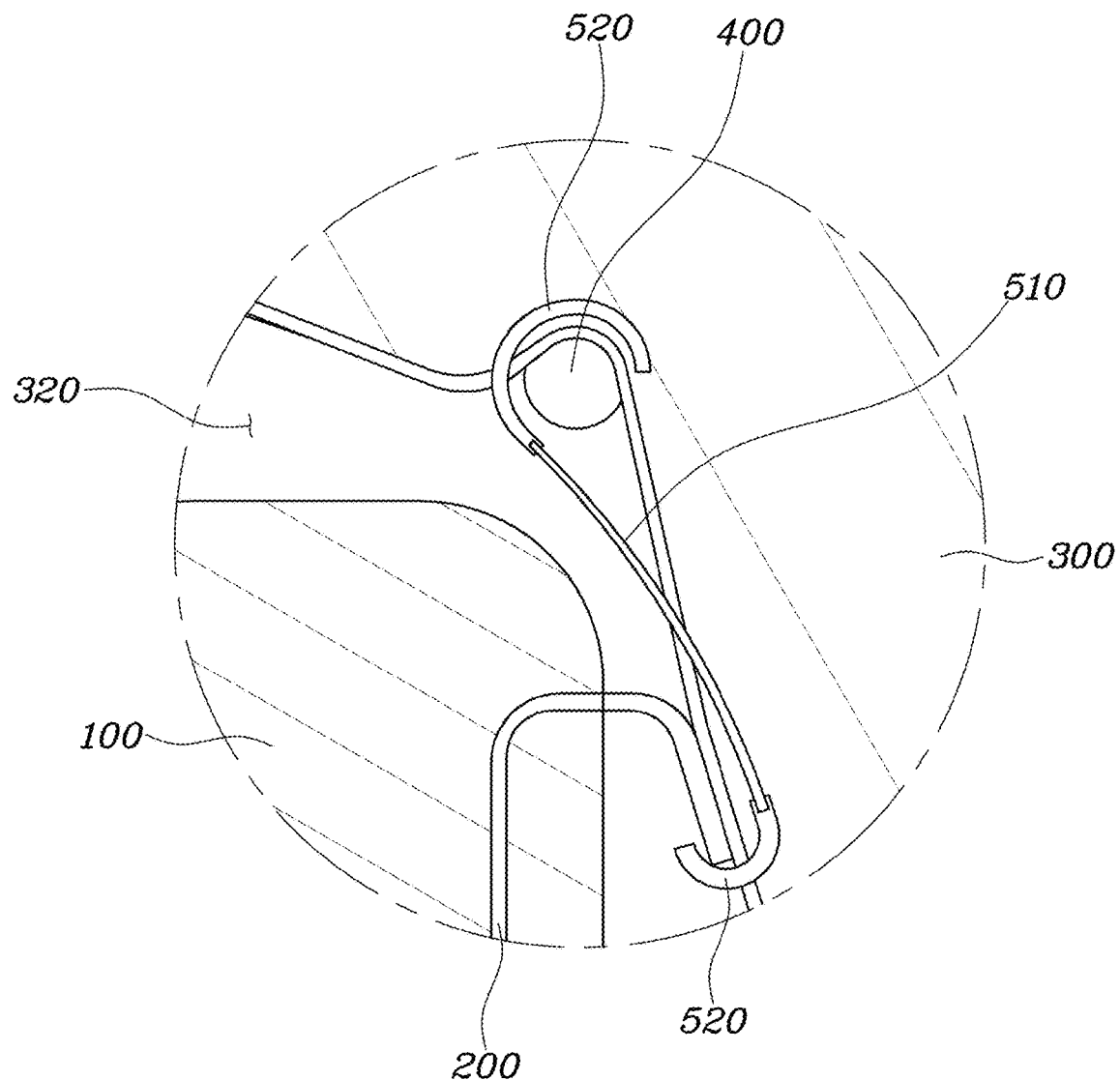

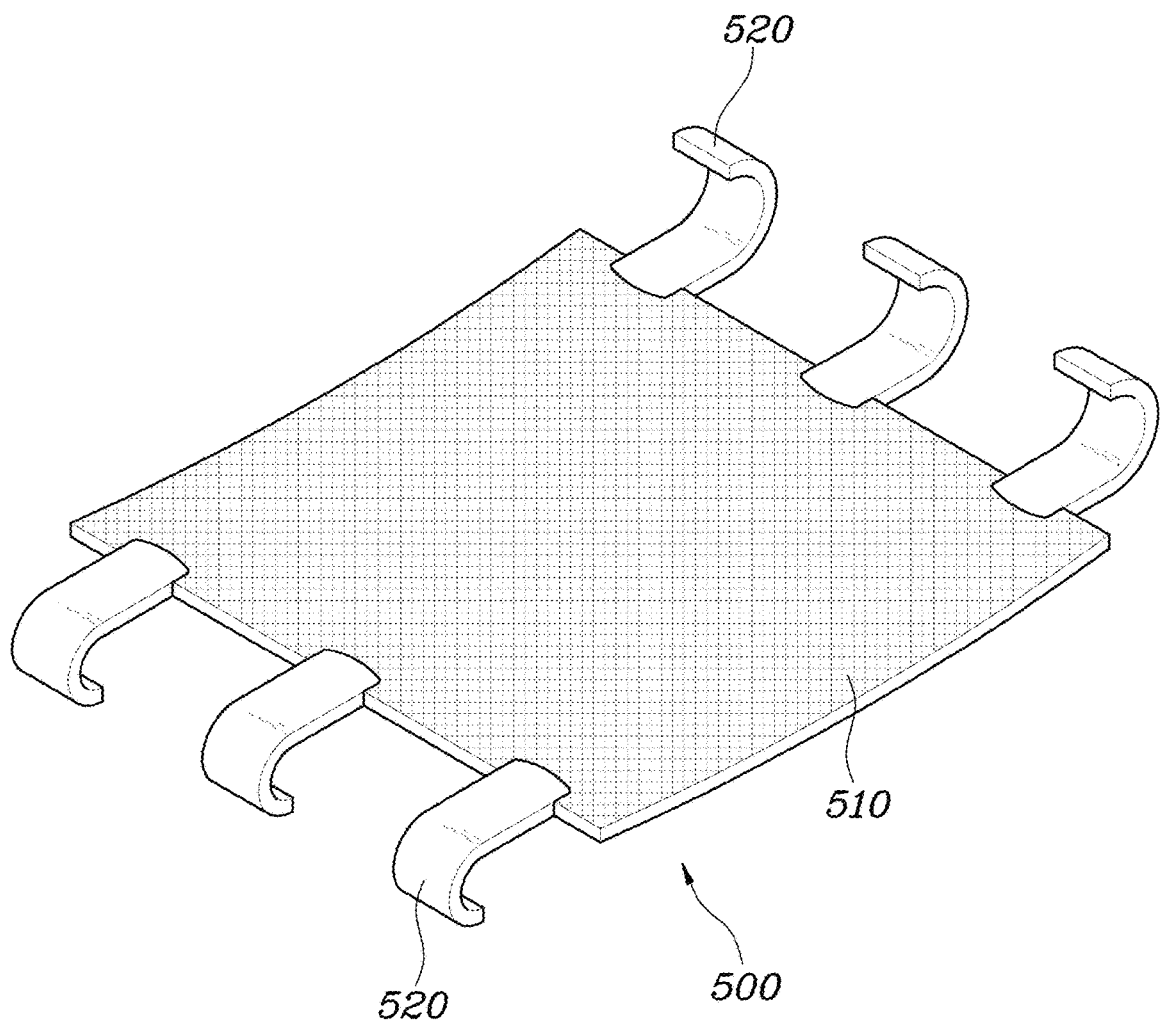
[FIG. 6]

SIDE AIRBAG GUIDE AND VEHICLE SEAT WITH SIDE AIRBAG USING SAME

CROSS REFERENCE TO RELATED APPLICATION

The present application claims priority to Korean Patent Application No. 10-2016-0090658, filed Jul. 18, 2016, the entire contents of which is incorporated herein for all purposes by this reference.

BACKGROUND

Field

The present disclosure relates generally to a side airbag guide and a vehicle seat with a side airbag using the same.

Description of the Related Art

Generally, an airbag applied to a vehicle is a safety device for protecting an occupant in the event of an impact such as a collision, and a vehicle is provided with various kinds of airbag devices, and particularly, a side airbag is provided to protect the occupants of the driver's seat and the passenger's seat from the impact occurring at the side of the vehicle.

The side airbag is installed in the seat back of the driver's seat and the front passenger's seat, and is deployed in the direction of the occupant's side of the seat in case of emergency so as to cushion the occupant from a side impact.

Accordingly, in order to more effectively cushion the occupant from a side impact, it is important that the airbag cushion deploys in the correct position and posture when the side airbag is deployed.

The disclosure of this section is to provide background of the invention. Applicant notes that this section may contain information available before this application. However, by providing this section, Applicant does not admit that any information contained in this section constitutes prior art.

SUMMARY

Accordingly, one aspect of the present invention proposes a side airbag guide and a vehicle seat with a side airbag using the same, in which it is possible to reduce the assembly time of the seat thanks to a simple structure, and it is possible to reduce the weight of the vehicle seat since the weight of the side airbag guide is light.

Another aspect of the invention proposes a side airbag guide and a vehicle seat with a side airbag using the same, in which a structure is simple and easy to assemble, and a deployment direction of an airbag cushion is guided and supported during deployment of the side airbag provided in a seat back of the vehicle seat.

Still another aspect of the present invention provides a vehicle seat with a side airbag, the vehicle seat including: an airbag module with an airbag cushion accommodated therein; a seat back frame with the airbag module mounted thereto; a seat back pad provided with a bolster protruding forward at each of opposite sides thereof, and an accommodation space allowing the airbag module to be accommodated therein; a bolster wire inserted into the bolster to support a side load of an occupant; and a side airbag guide configured such that a first side thereof is locked to the seat back frame and a second side thereof is coupled to the bolster wire, to guide a deployment direction of the airbag cushion.

The side airbag guide may include: a guide body made of a textile and configured to guide the deployment direction of the airbag cushion by coming into contact with the airbag cushion; and a plurality of hooks provided at opposite ends of the guide body and locked to the bolster wire and the seat back frame, respectively.

The guide body may be made of a material with less elongation than the seat back pad.

The seat back pad may be configured such that an inner surface of the bolster is formed with a channel in the deployment direction of the airbag cushion, to guide deployment of the airbag cushion.

Yet another aspect of the present invention provides a side airbag guide, which is an airbag guide mounted to a vehicle seat having an airbag module with an airbag cushion accommodated therein to guide operation of the airbag module, the side airbag guide including: a guide body of textile disposed on a deployment line of the airbag module and configured to guide a deployment direction of the airbag cushion by coming into contact with the airbag cushion; and a plurality of hooks provided at opposite ends of the guide body and respectively locked to a bolster wire and a seat back frame provided in the vehicle seat.

The guide body may be manufactured by plain weaving or twill weaving.

According to an embodiment of the present invention, it is possible to reduce the assembly time of the vehicle seat by facilitating assembly thereof thanks to a simple connection structure of the side airbag guide, and thereby it is possible to improve productivity.

Further, since the side airbag guide is lighter in weight than a typical side airbag guide manufactured by injection-molding, it is possible to reduce the weight of the vehicle seat, and it is possible to facilitate deployment of the airbag cushion and minimize the impact to occupants.

BRIEF DESCRIPTION OF THE DRAWINGS

The above and other aspects, features and other advantages of the present invention will be more clearly understood from the following detailed description when taken in conjunction with the accompanying drawings, in which:

FIG. 1 is a side view showing a typical vehicle seat with a side airbag;

FIG. 2 is a sectional view taken along line A-A of FIG. 1;

FIG. 3 is a side view showing a vehicle seat with a side airbag according to an embodiment of the present invention;

FIG. 4 is a sectional view taken along line B-B of FIG. 3;

FIG. 5 is an enlarged view showing area C of FIG. 4; and

FIG. 6 is a perspective view showing a side airbag guide according to an embodiment of the present invention.

DETAILED DESCRIPTION OF EMBODIMENTS

Hereinbelow, embodiments of the present invention will be described in detail with reference to the accompanying drawings. However, the present invention is not limited to the embodiments. For reference, the same reference numerals in this description refer to substantially the same elements and can be described with reference to the contents described in the other drawings under these rules, and the contents that are judged to be obvious to those skilled in the art or repeated may be omitted.

FIG. 1 is a side view showing a typical vehicle seat with a side airbag; and FIG. 2 is a sectional view taken along line A-A of FIG. 1.

As shown in FIGS. 1 and 2, a vehicle seat 20 with a side airbag is configured such that a seat back pad 301 is formed with a slit to guide a deployment direction of an airbag cushion when the side airbag is deployed by operating an airbag module 101 with an airbag cushion accommodated therein, and a side airbag guide 501 for guiding the airbag cushion to a direction of the slit is locked to a seat back frame 201.

Meanwhile, the seat back pad 301 is provided with a bolster wire 401 to support a side of an occupant, thereby supporting a force applied laterally on the vehicle seat 20.

Here, the side airbag guide 501 is molded by injection of steel or a plastic material with high rigidity, and is locked to the seat back frame 201 with a locking means such as a bolt, but it takes a long time to install and thereby productivity is lowered.

Further, the side airbag guide 501 is made of a heavy material such as steel or plastic, which increases the load of the vehicle, thereby lowering performance and fuel efficiency of the vehicle.

In embodiments of the present invention, a structure of a side airbag guide is simplified to facilitate the assembly, the development of the airbag cushion is stably supported, and performance and fuel efficiency of a vehicle are improved by reducing the weight thereof.

FIG. 3 is a side view showing a vehicle seat with a side airbag according to an embodiment of the present invention; FIG. 4 is a sectional view taken along line B-B of FIG. 3; and FIG. 5 is an enlarged view showing area C of FIG. 4.

As shown in FIGS. 3 to 5, a vehicle seat 10 with a side airbag according to an embodiment of the present invention includes: an airbag module 100, a seat back frame 200, a seat back pad 300, a bolster wire 400, and a side airbag guide 500.

The airbag module 100 is provided with an airbag cushion therein, and is configured such that the airbag cushion is inflated by gas supplied by an inflator when the impact occurs at the side of the vehicle and is deployed in a lateral direction of the occupant, thereby cushioning the occupant and protecting the occupant from the impact.

The seat back frame 200 is formed in a reversed U shape, and is provided with the airbag module 100 at an outboard side thereof. In embodiments, the seat back frame 200 is made of a material with excellent rigidity, and for example, it may be made of steel or a plastic material.

The seat back pad 300 is provided at the front of the seat back frame 200, wherein each of opposite end portions thereof is provided with a bolster 310 that supports the sides of the occupant and protrude forward to accommodate the airbag module 100, and the inside of the bolster 310 is formed with an accommodation space 320 with the airbag module 100 accommodated therein.

In embodiments, the seat back pad 300 is configured such that an inner surface of the bolster 310 is formed with a slit-shaped channel 330 along the deployment direction of the airbag cushion, to guide deployment of the airbag cushion.

This is to facilitate stable deployment in the lateral direction of the occupant by allowing the airbag cushion to penetrate through a relatively thin portion where the channel 330 is formed as the airbag cushion is inflated during the operation of the airbag module 100, thereby protecting the occupant from impact.

The bolster wire 400 is vertically provided at each of opposite sides of the seat back frame 200 to support a force applied laterally on the vehicle seat 10, that is, a force applied toward the direction of the bolster 310, and is disposed inside the bolster 310.

FIG. 6 is a perspective view showing a side airbag guide according to an embodiment of the present invention.

As shown in FIG. 6, the side airbag guide 500 according to an embodiment of the present invention includes: a guide body 510 configured to guide a deployment direction of the airbag cushion to a direction of the channel 330 by coming into contact with the airbag cushion when the airbag module 100 is operated; and a plurality of hooks 520.

The guide body 510 is configured to guide the deployment direction of the airbag cushion by coming into contact with the airbag cushion when the airbag module 100 is operated, and the guide body 510 according to an embodiment of the present invention may be of textile.

In embodiments, the guide body 510 according to embodiments of the present invention is made of a textile manufactured in a plain weave or twill weave manner, because a textile knitted with 1 to 2 warps and wefts is stronger than satin floating warp or weft on the surface, so it is not only capable of improving the durability and life of the side airbag guide, but also capable of stably supporting the development of the airbag cushion.

In embodiments, the guide body 510 is made of a material with lower elongation than that of the seat back pad 300. Thereby, the guide body 510 is stretched less than the seat back pad 300, so that the airbag cushion is inflated to effectively tear the portion where the channel 330 of the seat back pad 300 is famed, and deploys in the lateral direction of the occupant.

The hooks 520 are provided as a pair and are locked to opposite ends of the guide body 510, hooks 520 locked to a first end of the guide body 510 are locked by surrounding the bolster wire 400, and hooks 520 locked to a second end of the guide body 510 are locked to the seat back frame 200 at an inboard edge thereof of the front edges of the airbag module 100, so that the guide body 510 is disposed from the front edges of the airbag module 100 toward the channel 330.

In embodiments, the hooks 520 are made of a material with excellent rigidity to prevent damage caused by the impact during the operation of the airbag module 100, and for example, it may be made of steel or a plastic material.

Further, the number of the hook may be increased or decreased depending on the impact strength generated by the operation of the airbag module 100, or the like.

Although embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A vehicle seat with a side airbag, the vehicle seat comprising:
   an airbag module with an airbag cushion accommodated therein;
   a seat back frame with the airbag module mounted thereto;
   a seat back pad comprising a bolster protruding forward at each of opposite sides of the vehicle seat, the seat back pad defining an accommodation space configured to accommodate the airbag module;
   a bolster wire inserted into the bolster to support a side load of an occupant; and
   a side airbag guide comprising a first side configured to be locked to the seat back frame and a second side configured to be coupled to the bolster wire such that the side airbag guide guides a deployment direction of the airbag cushion,
   wherein the side airbag guide includes:

a guide body made of a textile and configured to guide the deployment direction of the airbag cushion by coming into contact with the airbag cushion; and a plurality of hooks provided at each opposite end of the guide body and configured to hook the bolster wire and the seat back frame, respectively.

2. The vehicle seat of claim 1, wherein the guide body is made of a material with less elongation than the seat back pad.

3. The vehicle seat of claim 1, wherein the seat back pad is configured such that an inner surface of the bolster is formed with a channel in the deployment direction of the airbag cushion, to guide deployment of the airbag cushion.

4. A side airbag guide, which is an airbag guide mounted to a vehicle seat having an airbag module with an airbag cushion accommodated therein to guide operation of the airbag module, the side airbag guide comprising:

a guide body of textile disposed on a deployment line of the airbag module and configured to guide a deployment direction of the airbag cushion by coming into contact with the airbag cushion; and a plurality of hooks provided at opposite ends of the guide body and respectively locked to a bolster wire and a seat back frame provided in the vehicle seat.

5. The side airbag guide of claim 4, wherein the guide body is manufactured by plain weaving or twill weaving.

\* \* \* \* \*